Feb. 10, 1970 R. ASHTON ET AL 3,494,210

AUTOMATIC BELT TENSIONER

Filed Oct. 29, 1968 2 Sheets-Sheet 1

INVENTORS.
ROBERT ASHTON
WILBERT D. WEBER
WALTER HIRSCH
BY Tweedale & Gerhardt
ATTORNEYS.

INVENTORS.
ROBERT ASHTON
WILBERT D. WEBER
WALTER HIRSCH
BY Tweedale & Gerhardt
ATTORNEYS.

United States Patent Office 3,494,210
Patented Feb. 10, 1970

3,494,210
AUTOMATIC BELT TENSIONER
Robert Ashton, Islington, Ontario, Wilbert D. Weber, Nashville, Ontario, and Walter Hirsch, Don Mills, Ontario, Canada, assignors to Massey-Ferguson Industries Limited, Toronto, Ontario, Canada, a corporation of Canada
Filed Oct. 29, 1968, Ser. No. 771,518
Int. Cl. F16h 55/52, 7/10
U.S. Cl. 74—230.17                    8 Claims

ABSTRACT OF THE DISCLOSURE

A variable speed drive comprises fixed input and output sheaves and an intermediate split sheave having an axially movable flange dividing the sheave into driving and driven portions. A pair of belts interconnect the input sheave with the split sheave and the split sheave with the output sheave. A mechanism is provided for shifting the split sheave relative to the input and output sheaves to vary the gearing ratio of the drive. Tension is maintained in the belts by biasing the split sheave away from both the input and output sheaves by a constant tension device. In one embodiment the constant tension device comprises a toggle linkage interconnecting the split sheave and the supporting arms and a compression spring which biases the toggle linkage from contracted to extended position such that the output force of the linkage increases upon movement of the split sheave. In another embodiment the spring is replaced by a constant pressure hydraulic motor. In a further embodiment a variable pressure hydraulic cylinder is controlled by a variable orifice valve, the position of which is governed by a toggle linkage interconnecting the valve and the split sheave so that increasing hydraulic pressure is applied to the sheave upon outward movement to provide constant tension.

---

This invention relates generally to variable speed traction drives and more specifically to an automatic tensioning means for such a drive.

Variable speed traction drives are conventionally used in many applications to provide infinitely variable speed ratios. Particularly in agricultural machines, these drives include spaced input and output sheaves and a split intermediate sheave interconnected by belts. The speed ratio is normally governed by shifting the split sheave relative to the input and output sheaves.

The belts tend to elongate or stretch with increased usage. Too little belt tension causes the belts to slip and reduces the power capabilities of the drive, while too much tension decreases belt life. The belt tension may be adjusted by moving one of the fixed sheaves or by adding a screw adjustment to the intermediate sheave for biasing it away from both the input and output sheaves. Therefore, the position of the sheaves must constantly be manually adjusted in order that the belts maintain the proper tension for long belt life and sufficient power output.

It has been proposed to provide a spring or hydraulic cylinder for biasing the split sheave away from both the input and output sheaves so that as the belts lengthen in use, the split sheaves will be biased away from the input and output sheaves to automatically compensate and maintain tension. However, as the angle between the input, split, and output sheaves decreases, the amount of linear force required by the biasing means to maintain constant tension increases. Thus linearly acting springs or hydraulic cylinders will provide only decreasing or constant force which results in decreased tension upon belt stretch.

It is therefore an object of this invention to provide a variable speed traction drive with belt tensioning means that provide increasing linear force upon belt stretch to provide constant belt tension to maintain power output and improve belt life.

In accordance with this invention, a variable speed drive is provided which includes support means, an input sheave, and output sheave, means mounting both sheaves on the support means in spaced relationship, a third sheave having a pair of fixed end flanges and an axially movable flange located therebetween to divide the third sheave into driver and driven portions, a primary belt interconnecting the input sheave and the driven portion, a secondary belt interconnecting the output sheave and the driver portion, speed adjustment means for shifting the movable flange axially to change the diameter of the input and output portions to vary the speed of the output sheave, means mounting the third sheave on the support for movement in a direction away from both the input and output sheaves, and belt tensioning means biasing the third sheave in said direction with a force increasing with increasing sheave movement in said direction to apply a substantially constant tension to both of said belts.

These and further objects, features and advantages of this invention can be more readily understood by reference to the following detailed description of several embodiments of this invention, with reference to the attached drawings, wherein.

Figure 1:
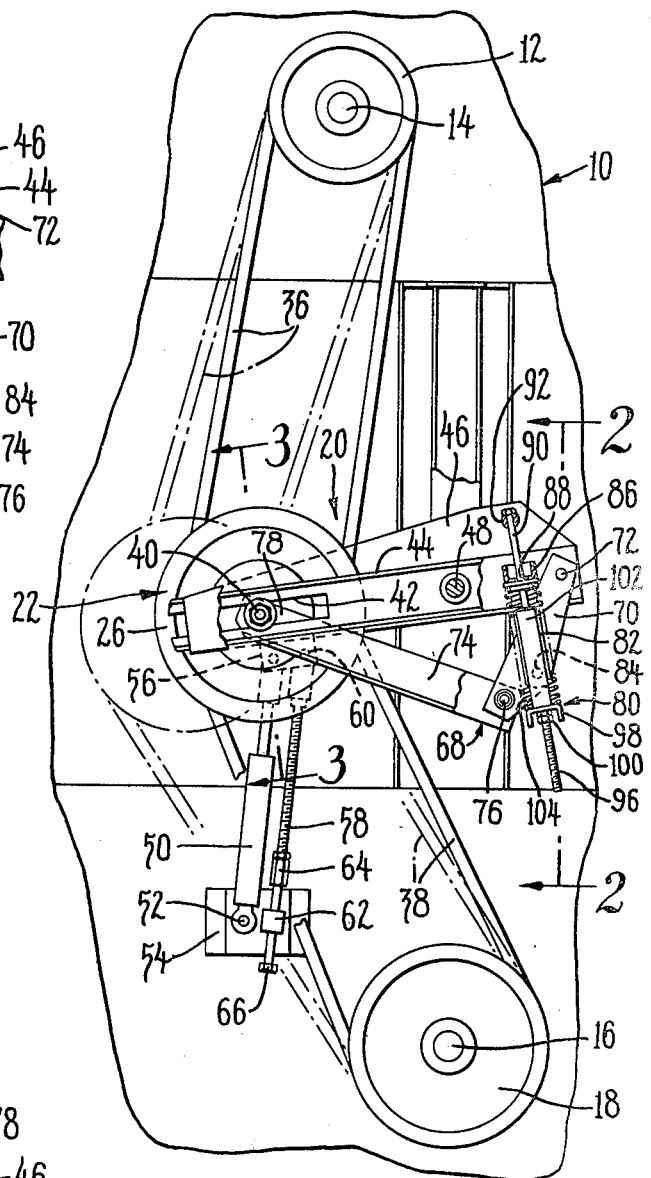
FIG. 1 is an elevational view of a preferred embodiment of a variable speed drive incorporating automatic tensioning means according to this invention, with the drive shown in both initial and belt worn positions.

Referring now to FIG. 1 of the drawings, an agricultural machine 10 (only partially shown) is propelled by drive wheels (not shown) driven by a variable speed traction drive. The drive includes a driving sheave 12 which is mounted on a driveshaft 14 that is powered by a power source (not shown) located within the machine 10. The drive wheels of the machine 10 are driven from an output shaft 16 which mounts an output sheave 18. The variable speed drive is provided with a speed ratio varying device 20 which includes an intermediate split sheave 22.

Figure 3:
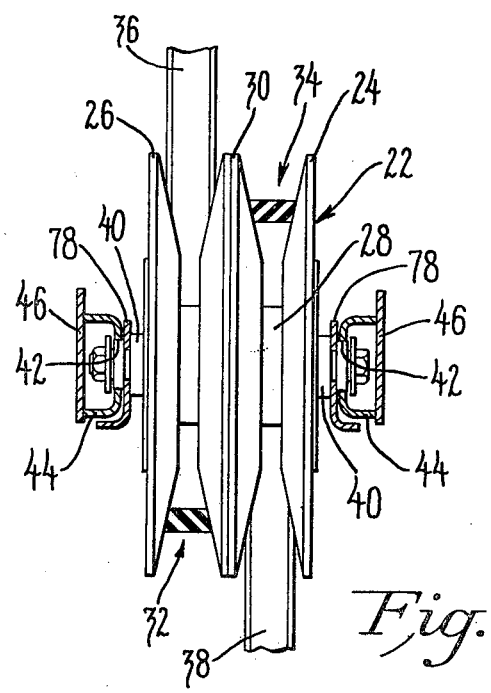
FIG. 3 is an enlarged sectional view taken generally along lines 3—3 of FIG. 1.

As best shown in FIG. 3, the split sheave 22 includes a pair of end flanges 24 and 26 that are mounted a fixed distance apart on a shaft 28. An intermediate flange 30 is slideably mounted on shaft 28 and divides sheave 22 into a driven portion 32 and a driver portion 34. The driven portion 32 is connected to the input pulley 12 by a primary V-belt 36, while the driver portion 34 is connected to output pulley 18 by a secondary V-belt 38.

Referring now to FIGS. 1 and 3, the shaft 28 has its ends 40 slideably mounted in elongated slots 42 of identical arms 44 that are interconnected by a framework 46. The arms 44 are pivoted to a shaft 48 which is carried by supporting structure of machine 10.

An extensible hydraulic cylinder 50 which is powered from a hydraulic pump (not shown) is pivoted at 52 to a mounting bracket 54 mounted on machine 10. The output arm of cylinder 50 is pivoted to a bracket 56 that is mounted on the supporting structure 46 so that extension and retraction of the cylinder 50 will cause movement of sheave 22 toward and away from each of the input and output sheaves 12 and 18, respectively, to change the gearing ratio of the drive and thus vary the speed of output sheave 18 in a conventional manner. A speed limiting device 58 is pivoted at 60 to bracket 56 and at 62 to bracket 54 and includes high and low speed limiting stops 64 and 66, respectively.

Figure 2:
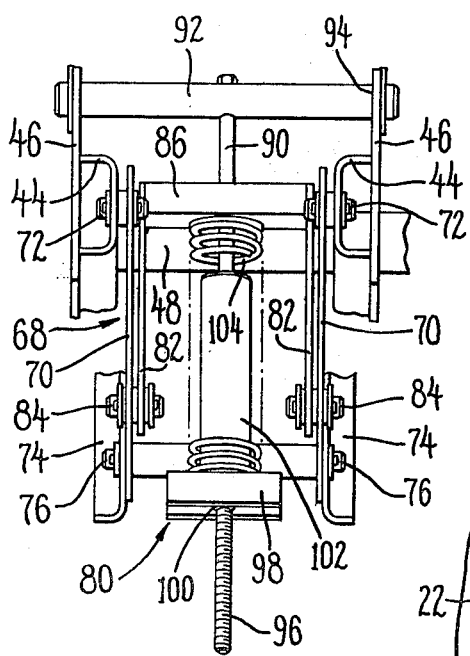
FIG. 2 is an enlarged sectional view taken generally along lines 2—2 of FIG. 1.

Referring now to FIGS. 1 and 2, sheave 22 is biased from the solid line position toward the phantom line position by a belt tensioning device 68 to maintain tension in both belts 36 and 38. Belt tensioning device 68 includes a first pair of spaced links 70, which are pivoted at 72 to supporting structure 46, and a second pair of spaced links 74 which are pivoted by a rod 76 to links 70 and at their other ends 78 to the ends 40 of shaft 28.

The belt tensioning device 68 incorporates a biasing unit 80, best shown in FIG. 2. The biasing unit 80 includes a bracket 82 that is pivoted at 84 to each of the links 70 and mounts stop means in the form of a cross bracket 86 at its upper end. The bracket 86 is apertured at 88 to receive a rod 90 that has one end mounted to a cross shaft 92 journalled at 94 the supporting structure 46. At its other end, rod 90 is threaded at 96 and mounts stop means in the form of a channel bracket 98 that is held in place by nuts 100. Between the brackets 86 and 98, rod 90 carries a spring guide 102 that is embraced by a compression coil spring 104 confined between brackets 86 and 98.

As best shown in FIG. 1, the compression spring 104 biases bracket 86 upwardly which, through bracket 82, pivots link 70 upwardly. This tends to extend the toggle linkage 70, 74 and bias sheave 22 outwardly toward the phantom line position to maintain belt tension. As the belts 36 and 38 elongate with wear, the compression spring 104 will extend the toggle linkage to move sheave 22 outwardly toward the phantom line position to maintain tension on belts 36, 38.

Figure 4:
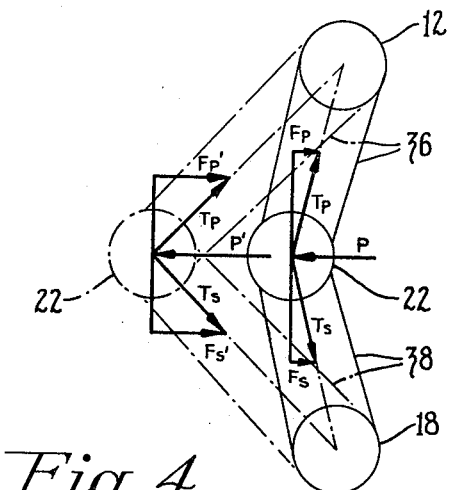
FIG. 4 is a force diagram showing the linear force requirements for maintaining constant belt tension.

FIG. 4 shows how the linear outward biasing force required on sheave 22 increases as the belts stretch. In the solid line position of FIG. 4, which corresponds to the solid line position of FIG. 1, the tension on the primary and secondary belts required for a particular drive are represented by force vectors T$p$ and T$s$. The horizontal components of these forces F$p$ and F$s$ are added together to yield a force P required to be exerted by the toggle linkage on sheave 22.

As the belts elongate with usage, the toggle linkage and spring will force sheave 22 outwardly so that the included angle between sheaves 12, 22 and 18 is decreased, as shown exaggerated in phantom lines in FIG. 4. In this position it can readily be seen that the horizontal components F$p'$ and F$s'$ of the required tension forces T$p$ and T$s$ are much greater than in the original position. Thus the required force P' necessary to be exerted by the toggle linkage on sheave 22 to maintain a constant tension is greatly increased.

Figure 5:
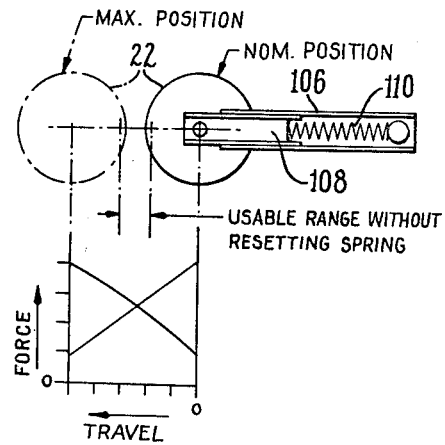
FIG. 5 is a schematic representation of a prior art tensioning device, including a diagram plotting force versus sheave travel.

FIG. 5 schematically shows a prior art proposal for providing an automatic tensioning device for such a variable speed drive. In this device the sheave 22 is biased outwardly by a spring tensioner comprising a guide member 106 which carries a slide 108 that is biased outwardly by a compression spring 110. As the sheave 22 moves outwardly to the phantom line position, the compression spring 110 elongates and thus the spring force decreases. As shown in the force-travel diagram in FIG. 5, the required force increases with travel of sheave 22, while the actual force exerted on the sheave by the spring 110 decreases. Thus this prior art device has only limited effectiveness, since it permits belt tension to decrease, rather than remain constant. Such a device would require periodic manual adjustment. Otherwise, the tension would eventually decrease to the point where the belts would slip. On the other hand, if the spring were over-tensioned to begin with to decrease the frequency of manual adjustment, the initial overtensioning of the belts would tend to decrease belt life.

Figure 6:
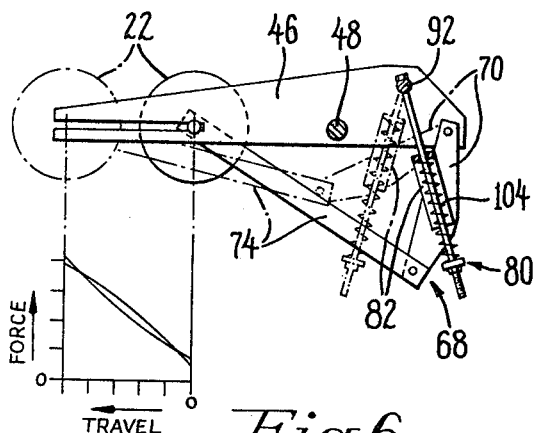
FIG. 6 is a schematic representation of the operation of the preferred embodiment shown in FIG. 1, including a diagram plotting force versus sheave travel.

FIG. 6 schematically shows the operation of the belt tensioning device 68 shown in FIG. 1. As the primary and secondary belts 36, 38 elongate, the spring 104 causes extension of the toggle linkage 70, 74. Although the spring force decreases with increased sheave travel, the geometry of the toggle linkage is such that, as the linkage is extended, the output linear force exerted on sheave 22 is increased, although not exactly linearly. This is illustrated in the force-travel diagram which shows that the actual force output of tensioning device 68 on sheave 22 varies slightly from the force required to maintain perfectly constant tension. However, the required and actual force lines are extremely close and therefore a substantial constant tension is exerted on both belts at all stages of belt elongation. A mechanical analysis of the requirements for a particular variable speed drive unit will determine the length and relative sizes of the links, the exact placement of pivot points, and the spring characteristics.

Figure 7:
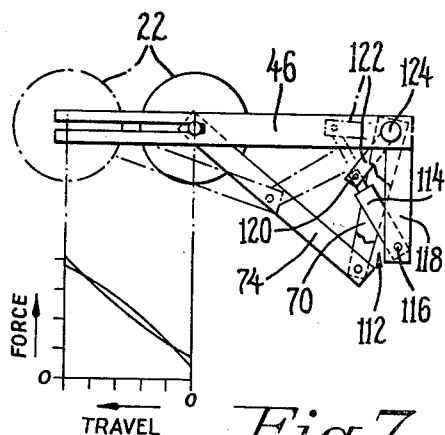
FIG. 7 is similar to FIG. 6, showing an alternative embodiment of this invention including a diagram plotting force versus travel.

FIG. 7 schematically shows the operation of an alternative embodiment of the invention. Here the spring tensioning device 68 is replaced by a hydraulic unit 112 which includes a conventional hydraulic cylinder 114 which is pivoted at 116 to a portion 118 of supporting structure 46. The other end 120 of cylinder 114 is pivoted to an arm 122 mounted on a rod 124 which is rigidly attached to the link 70. The hydraulic unit 112 is preferably a constant pressure device which will, like the spring device of FIGS. 1 and 6, produce an increasing output force on sheave 22 substantially identical to the force required to maintain constant belt tension, as shown in the force-travel diagram of FIG. 7. Since the hydraulic unit 112 is constant pressure, it will not decrease in force output upon movement of the sheave 22 as will the spring 104. Therefore, the linkage structure would vary somewhat from that of the spring operated device, dependent, of course, on the geometry and characteristics of a particular drive.

Figure 8:
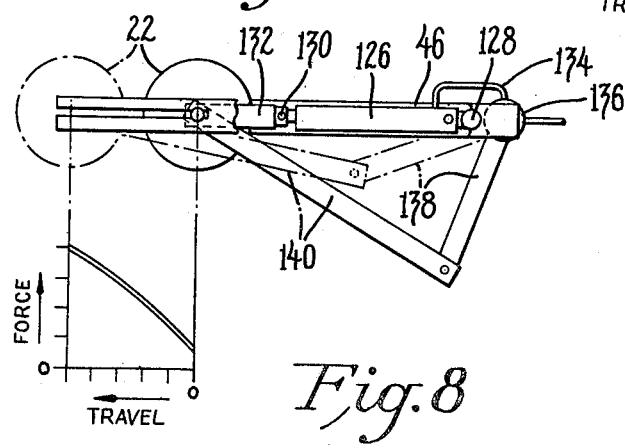
FIG. 8 is similar to FIG. 6, illustrating yet another embodiment of this invention, including a diagram plotting force versus travel.

FIG. 8 schematically shows the operation of yet another embodiment of the invention. Here a variable pressure hydraulic cylinder 126 is rigidly mounted at 128 to supporting structure 46 and is connected at 130 to bracket 132 mounted on sheave 22. The cylinder 126 is provided with hydraulic fluid through a line 134 from a variable pressure rotary valve 136. The position of valve 136 is controlled by a toggle linkage comprising links 138 and 140 which are connected to the sheave 22. Thus as sheave 22 moves outwardly the linkage 138, 140 shifts the valve 136 to admit increased hydraulic pressure to cylinder 126 to duplicate the required force output on sheave 22 to maintain constant belt tension. This is shown in the force-travel diagram of FIG. 8. The valve 136 design will vary according to the geometry and characteristics of a particular drive.

Thus a belt tensioning device according to this invention will provide a variable speed drive with a substantially constant belt tension so that no manual adjustment after installation is necessary to maintain a substantially constant belt tension. This will significantly increase the life of both the primary and secondary belts, will maintain proper power output by eliminating belt slip, and will dramatically reduce maintenance cost by eliminating time consuming adjustment and cost of replacement belts occasioned by slipping and breaking belts.

We claim:

1. In a variable speed drive including support means, an input sheave mounted on the support means, an output sheave mounted on the support means, a third sheave having a pair of spaced end flanges and a movable flange located therebetween to divide the third sheave into driver and driven portions, a primary belt interconnecting the input sheave and the driven portion, a secondary belt interconnecting the output sheave and the driver portion, and speed adjustment means for moving the third sheave in a direction toward the input sheave and away from the output sheave to decrease output sheave speed and in a second direction away from the input sheave and toward the output sheave to increase output sheave speed, the improvement comprising: means mounting the third sheave on the support means for movement in a third direction away from both the input and output sheaves, and belt tensioning means mounted on the support means for applying a variable force biasing the third sheave in the third direction to tension the belts, the force increasing with increasing movement of the third sheave in the third direction to apply substantially constant tension to both belts.

2. In a variable speed drive including support means, an input sheave, an output sheave, means mounting both sheaves on the support means in fixed spaced relationship, a third sheave having a pair of fixed end flanges and an axially movable flange located therebetween to divide the third sheave into driver and driven portions, a primary belt interconnecting the input sheave and the driven portion, a secondary belt interconnecting the output sheave and the driver portion, and speed adjustment means for shifting the movable flange axially to change the diameter of the input and output portions to vary the speed of the output sheave, the improvement comprising: means mounting the third sheave on the support for movement in a direction away from both the input and output sheaves, and belt tensioning means biasing the third sheave in said direction with a force increasing with increasing sheave movement in said direction to apply a substantially constant tension to both of said belts.

3. The structure of claims 1 or 2 wherein: the biasing means include a toggle linkage interconnecting the support and the third sheave and movable from a contracted to an extended position to move the third sheave in the said direction, and a biasing device mounted on the support and engageable with the toggle linkage to bias the linkage from contracted to extended position.

4. The structure of claim 3, wherein: the biasing device is a spring.

5. The structure of claim 3, wherein: the biasing device is a fluid pressure motor.

6. The structure of claim 3, wherein: the toggle linkage includes a first link pivoted to the mounting means and a second link pivoted to the third sheave and to the first link, and the biasing device includes spring means interconnecting the support and the first link.

7. The structure of claim 6, wherein: the spring means include a member pivoted at one end to the support, a bracket pivoted at one end to the first link intermediate its pivots, means slideably mounting the other end of the bracket on the member intermediate its ends, stop means mounted on the member adjacent its other end, and a compression spring confined between the stop means and bracket other end for biasing the bracket and first link toward the member pivot.

8. The structure of claims 1 or 2 wherein: the biasing means include a fluid pressure motor mounted on the support means and connected to the third sheave for biasing the third sheave in said direction, and means responsive to the position of the third sheave for controlling motor fluid pressure to exert an increasing force on the third sheave upon increasing sheave movement in said direction.

References Cited

UNITED STATES PATENTS

| | | | |
|---|---|---|---|
| 1,186,982 | 6/1916 | Hall | 74—242.11 |
| 2,510,325 | 6/1950 | Anderson. | |
| 2,639,569 | 5/1953 | Pasturczak | 74—230.17 XR |
| 3,142,193 | 7/1964 | Polko et al. | 74—242.11 |
| 3,295,384 | 1/1967 | Love et al. | 74—230.17 |

JAMES A. WONG, Primary Examiner

U.S. Cl. X.R.

74—242.12